US007392373B2

(12) United States Patent
Accapadi et al.

(10) Patent No.: US 7,392,373 B2
(45) Date of Patent: *Jun. 24, 2008

(54) GRANULARITY ON A PER PORT BASIS OF REQUEST-RESPONSE COMMUNICATIONS OVER A NETWORKED COMPUTER SYSTEM

(75) Inventors: Jos Manuel Accapadi, Austin, TX (US); Kavitha Vittal Murthy Baratakke, Austin, TX (US); Andrew Dunshea, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/767,842

(22) Filed: Jun. 25, 2007

(65) Prior Publication Data

US 2007/0294521 A1    Dec. 20, 2007

Related U.S. Application Data

(63) Continuation of application No. 10/860,409, filed on Jun. 3, 2004, now Pat. No. 7,275,151.

(51) Int. Cl.
G06F 15/177 (2006.01)
G06F 9/445 (2006.01)

(52) U.S. Cl. ................. 713/1; 713/2; 713/100; 709/226; 709/228; 709/235; 370/229; 370/238; 370/395.21

(58) Field of Classification Search ............... 713/1, 713/2, 100; 709/226, 228, 235; 370/229, 370/238, 395.21
See application file for complete search history.

(56) References Cited

U.S. PATENT DOCUMENTS

| 5,878,232 | A | 3/1999 | Marimuthu |
| 6,544,126 | B2 * | 4/2003 | Sawano et al. ........ 463/42 |
| 7,027,406 | B1 | 4/2006 | Shabtay et al. |

* cited by examiner

Primary Examiner—Nitin C. Patel
(74) Attorney, Agent, or Firm—Casimer K. Salys; Schubert Osterrieder & Nickelson PLLC

(57) ABSTRACT

Methods, systems, and media are disclosed for improved granularity of a response-request communication on a networked computer system. One example embodiment includes receiving the request-response communication by the networked computer system, and associating the request-response communication with a port, having a nodelay setting, from a set of ports on the networked computer system. Further, the example embodiment includes enabling, based upon the associating, the nodelay setting upon connection of the request-response communication with the port. Further still, the example embodiment includes sending, in accordance with the enabling, the request-response communication to a destination in communication with the networked computer system. In addition, further example embodiments include configuring the ports on the networked computer system with nodelay values indicating whether a particular port is assigned nodelay or no nodelay for a request portion or request portion of a request-response communication connecting to that particular port.

7 Claims, 4 Drawing Sheets

| PORT NUMBER | DESCRIPTION |
| --- | --- |
| 1 | TCP PORT SERVICE MULTIPLEXER (TCPMUX) |
| 5 | REMOTE JOB ENTRY (RJE) |
| 7 | ECHO |
| 18 | MESSAGE SEND PROTOCOL (MSP) |
| 20 | FTP -- DATA |
| 21 | FTP -- CONTROL |
| 29 | MSG ICP |
| 37 | TIME |
| 43 | WHOIS |
| 49 | LOGIN HOST PROTOCOL (LOGIN) |
| 53 | DOMAIN NAME SYSTEM (DNS) |
| 69 | TRIVIAL FILE TRANSFER PROTOCOL (TFTP) |
| 70 | GOPHER SERVICES |
| 79 | FINGER |
| 80 | HTTP |
| 103 | X.400 STANDARD |
| 108 | SNA GATEWAY ACCESS SERVER |

FIG 1
PRIOR ART

GRANULARITY ON A PER PORT BASIS OF REQUEST-RESPONSE COMMUNICATIONS OVER A NETWORKED COMPUTER SYSTEM

CROSS REFERENCE

This application is a continuation application of U.S. patent application Ser. No. 10/860,409 currently entitled NODELAY PER PORT, filed Jun. 3, 2004, now U.S. Pat. No. 7,275,151, the disclosure of which is incorporated herein in its entirety for all purposes.

FIELD OF INVENTION

The invention generally relates to improved throughput of data communications on computer systems. More particularly, the invention relates to methods, systems, and media for enabling nodelay on a per port basis.

BACKGROUND

Personal computer systems are well known in the art. They have attained widespread use for providing computer power to many segments of today's modern society. Personal computers (PCs) may be defined as a desktop, floor standing, or portable computer that includes a system unit having a central processing unit (CPU) and associated volatile and non-volatile memory, a display, an input-output device such as a keyboard and/or a mouse, a storage device such as a hard disk storage drive, and, in many instances, a network interface adapter. One of the distinguishing characteristics of these systems is the use of a motherboard or system planar to electrically connect these components together. Examples of such personal computer systems are IBM's PC 300 series, Aptiva series, and Intellistation series.

The widespread use of PCs in conjunction with networks has resulted in a reliance on the network resources, or other computer systems, for, just to name a few, telecommuting, obtaining news and stock market information, trading, banking, shopping, shipping, communicating in the form of Voice Internet protocol (VoiceIP) and email. For many, PCs represent an essential tool for their livelihood. In today's networked world, the availability and performance of the network is as important as the availability and performance of the personal computer. Thus, it is desirable to minimize loss of productivity by increasing availability of network resources.

Computer systems typically communicate with network resources via local area networks (LANs), such as campus-area networks (CANs) or home-area networks (HANs), or via wide area networks (WANs), such as metropolitan-area networks (MANs) or the Internet. More specifically, each computer system includes or is connected to a network switch to transmit transactions to other computer systems and each operating system running on the multiple computer systems has its own Transmission Control Protocol/Internet Protocol (TCP/IP) stack to coordinate transmission and receipt of the transactions. For instance, when data is being transmitted out of a computer system, the data is first forwarded to the TCP/IP stack, which packages packets of the data with headers. The headers, such as TCP headers or User Datagram Protocol (UDP) headers, identify the application programs running on the source and the destination computer systems that are involved in the transaction.

Unlike TCP, which requires an acknowledgment at the receiving end (handshaking) before the session can begin, UDP just sends out packets in a one-way transmission. UDP is more efficient, for instance, in real-time audio and video transmissions in which lost packets are preferably ignored. The lost packets are preferably ignored in such situations because there is insufficient time to retransmit the packet.

The headers identify sockets for the source and destination computer system, which are a combination of (1) the computer system's IP address and (2) the application's port. If the actual IP address is unknown but the computer system is known by name, a Domain Name System server (DNS server) converts the name into the IP address. In Windows® networks, for example, a Windows® Internet Name System server (WINS server) converts NetBIOS names into IP addresses. For clarity's sake, a socket is part of an operating system and is a software object that connects an application to a network protocol. In UNIX, for example, a program can send and receive TCP/IP messages by opening a socket and reading and writing data to and from the socket. This simplifies program development because the programmer need only worry about manipulating the socket and can rely on the operating system to actually transport messages across the network correctly. Note that a socket in this sense is completely soft—it is a software object, not a physical component.

A port is a portion of the configurable socket enabling communication connections over a networked computer system. Ports are logical numbers assigned to applications that communicate with other computer systems. Some common applications like FTP, SMTP, and HTTP have agreed-upon or well-known port numbers. For example, HTTP applications accessible via the Internet are at port 80, so a web server may be identified by its IP address and port 80. See more examples of ports and their common port numbers at FIG. 1.

With this background, it is time to turn to request-response ("RR") communications over a networked computer system such as a request, e.g., a URL, from the Internet, e.g., a webpage. Currently, networked computer systems wait a finite amount of time, such as 50-200 ms, before sending the packets of data that collectively make up the request or response in an RR communication. This finite amount of time is for filling the packets with information with a mindset towards efficient load balancing and bandwidth utilization. Sometimes, however, the request or response is so small that the RR communication is waiting for no purpose. That is, there is no more information to put in the packets that make up the request or response; the packets, even if not full, are ready to go through the port to the other side. As a result, the remainder of the finite amount of time is idle time, i.e., needless delay, adversely affecting throughput efficiency, and, in such a case, throughput efficiency is better served by enabling such packets with no delay, or "nodelay" as this is commonly termed in the industry. On the other hand, however, the information filling the packets comprising the response or request in a RR communication is large, and bandwidth utilization, as well as throughput and load balancing are ill-served by immediately sending incompletely filled packets without allowing a standard finite amount of time to fill the packets. In this situation, delay, rather than nodelay, is preferred.

Presently, granularity to address RR communication through ports on a computer system is lacking. A present solution for rigidly addressing "nodelay"/delay dilemma to optimize connectivity is on a per adapter basis, which means all communications are happening within a nodelay or delay mode. Often, however, there are a mix of communications occurring over a networked computer system, wherein some communications require nodelay and others require delay in order to maximize bandwidth utilization and throughput efficiency. As a result, a per adapter basis is a one-size-fits-all solution that, in reality, does not fit all communications occurring over a networked computer system, and thereby, results in inefficiencies not solved by the prior solutions.

A need, therefore, exists, for methods, systems, and media for improved granularity of request-response communications over a networked computer system.

SUMMARY OF THE INVENTION

Embodiments of the invention generally provide methods, systems, and media for improved granularity of a response-request communication on a networked computer system. In one embodiment, the method generally includes receiving the request-response communication by the networked computer system, and associating the request-response communication with a port, having a nodelay setting, from a set of ports on the networked computer system. Further, the method includes enabling, based upon the associating, the nodelay setting upon connection of the request-response communication with the port. Further still, the method includes sending, in accordance with the enabling, the request-response communication to a destination in communication with the networked computer system. In further embodiments, the method includes configuring each of the ports with nodelay values.

In another embodiment, the system generally includes a receiver on the networked computer system for receiving the request-response communication from, perhaps, a computer system in communication with the networked computer system. Further, the system generally includes a port associator for associating the request-response communication with a port, having a nodelay setting, from a set of ports on the networked computer system. Further still, the system includes an enabler module for enabling, based upon the port associator, the nodelay setting upon connection of the request-response communication with the port. Yet further, the system includes a transmitter module for sending, after execution by the enabler module, the request-response communication to a destination in communication with the networked computer system.

In yet another embodiment, the invention provides a machine-accessible medium containing instructions, which when executed by a machine, cause the machine to perform operations for improved granularity of a response-request communication on a networked computer system. The instructions generally include operations for receiving the request-response communication by the networked computer system, and operations for associating the request-response communication with a port, having a nodelay setting, from a set of ports on the networked computer system. Further, the instructions include operations for enabling, based upon the associating, the nodelay setting upon connection of the request-response communication with the port. Further still, the instructions generally include operations for sending, in accordance with the enabling, the request-response communication to a destination in communication with the networked computer system.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 depicts a table showing some ports and their conventionally assigned port numbers in accordance with the disclosed invention.

DETAILED DESCRIPTION OF EXAMPLE EMBODIMENTS

Figure 2:
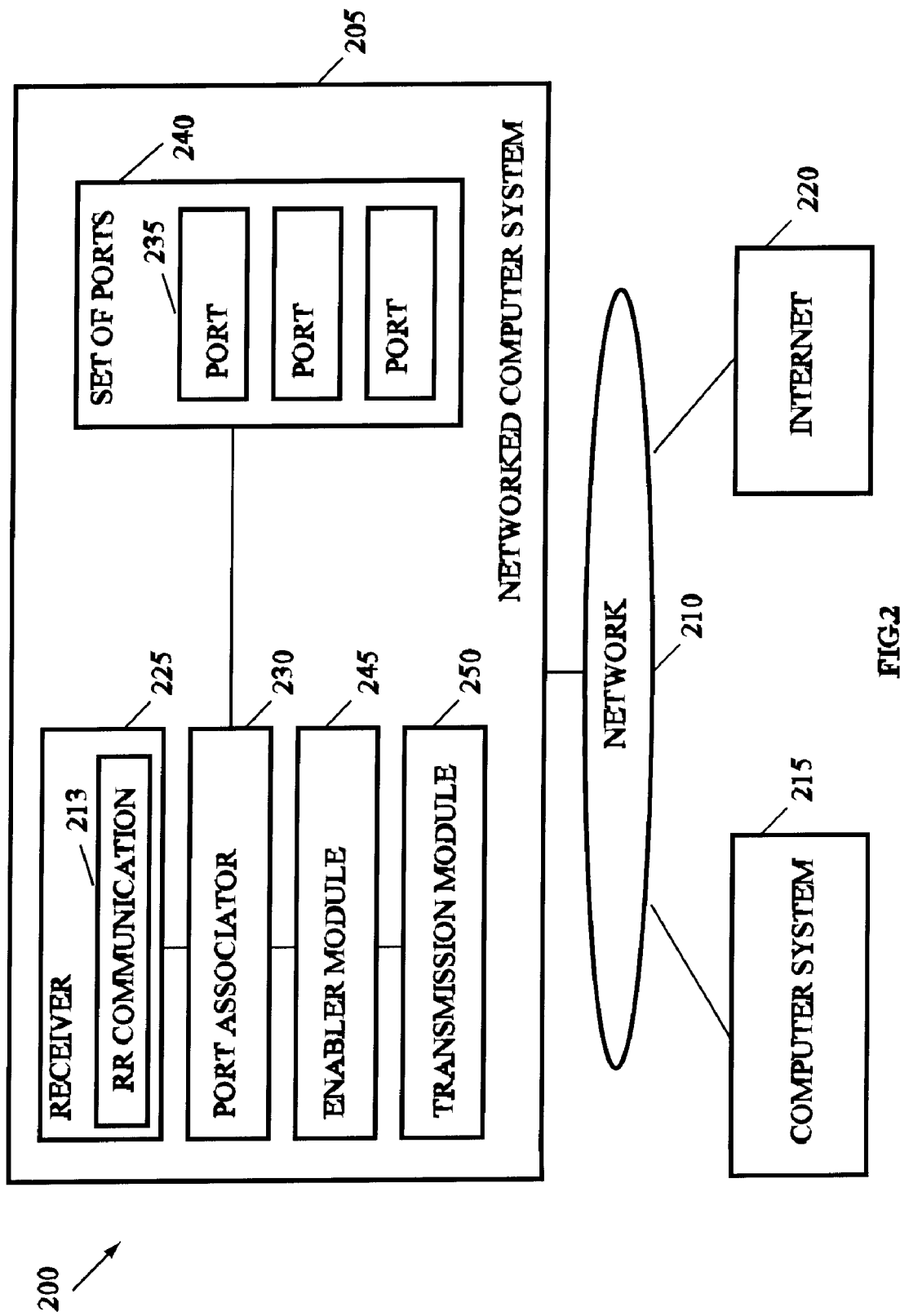
FIG. 2 depicts an example embodiment of a system for improved granularity of a response-request communication for a networked computer system in accordance with the disclosed invention.

The following is a detailed description of example embodiments of the invention depicted in the accompanying drawings. The embodiments are examples and are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, systems, methods, and media for improved granularity of request-response communications over a networked computer system are contemplated. Embodiments include a networked computer system in optional communication with physical or logical entities, such as databases, files, applications, devices, other computer systems, the Internet, and so on. Further, the networked computer system is capable of transmitting requests and responses for data in packet form, collectively request-response ("RR") communications, over its network. The transmission of these RR communications occurs through ports associated with the networked computer system. These ports have standard number assignments indicating the type of communication, such as HTTP traffic associated with port 80. To facilitate faster transmission of the RR communications through these ports, where appropriate or desired, the ports are configured on a per port basis with an associated port parameter value of "nodelay" for no delay or delay. Nodelay or delay, themselves, respectively indicates whether to immediately send or wait a finite amount of time to send the packets containing the underlying data in the RR communication upon connection with a port of the computer system. With this granularity, that is, flexibility at a per port basis for enabling nodelay or delay in handling transmissions of RR communications, connectivity, at least in terms of throughput, is optimized for the mix of communications commonly occurring on a networked computer system.

Before turning to the example embodiments of the invention, some general discussion of definitions, as used in this invention, is perhaps appropriate to enhance understanding of sockets, ports, port numbers, and packets, which are terms used in disclosing the specifics of the invention. Sockets are software objects that connect an application to a network protocol, which is an agreed-upon format for transmitting data between two devices. In UNIX, for example, a program can send and receive TCP/IP messages by opening a socket and reading and writing data to and from the socket. This simplifies program development because the programmer need only worry about manipulating the socket and can rely on the operating system to actually transport messages across the network correctly. A configurable part of the socket, as disclosed in this invention, is its interaction with a port, which, for TCP/IP and UDP networks, is an endpoint to a logical connection. That is, a port is a Janus-construct in that it is a connectivity point for incoming and outgoing data found in packets, which also contains the destination address, associated with RR communications. As shown in FIG. 1, some ports have numbers that are pre-assigned to them by the Internet Assigned Numbers Authority, and these are known as well-known ports. Further, port numbers range from 0 to 65536, but only ports numbers 0 to 1024 are reserved for privileged services and designated as well-known ports. This list of well-known port numbers specifies the port used by the server process as its contact port.

Turning now to a more detailed discussion, FIG. 2 shows a networked computer system 205 connected to a network 210, which may be wired or wireless, for receiving a request or a response, i.e., an RR communication 213, from a computer system 215 connected to the network 210. The computer system 215 may be a local or remote client in network 210 communication with the networked computer system 205, which is, for example, connected to the Internet 220. Although FIG. 2 depicts the Internet 220, it is understood that this is depicted for exemplification purposes in the handling of a RR communication for the system 200. That is, instead of the Internet 220, the system 220 could equally be a database or web service application, for example, in communication with the networked computer system 205 for the transmission handling of a RR communication as is capable through implementation of the disclosed invention. In addition, it is noteworthy to mention that the computer system 215 is not necessary, and is depicted solely for illustration. That is, the networked computer system 205, itself, may receive the RR communication by a user, for example, inputting the request or receiving the response directly on the networked computer system 205.

FIG. 2 shows the receiving an RR communication by a receiver 225 located on the networked computer system 205. The receiver 225 is a buffer, for example, which is a repository for the filling of the packets with the information and data being received for sending to a destination embedded in the header of the packets. Before sending the packets being filled with the pertinent data and information, coded logic found in software and/or reduced to hardware, directs the packets to a port associator 230. The port associator 230, also enabled by logic, searches and finds the appropriate port 235 in a set 240 of ports associated with the networked computer system 205. The appropriate port 235 means the assigned port, such as those shown in FIG. 1, for the type of network traffic port associated with the request or response packets of the RR communication 213 at issue. For instance, a request such as URL would travel through port 80, as shown on FIG. 1, because HTTP traffic is assigned to travel through this port. Furthermore, the response to this example request, such as a webpage, would also travel through port 80 back to the networked computer system 205, and possibly, onto computer system 215 if computer system 215 is the requester for these RR communications 213.

However, before sending the RR communication 213 to a destination associated with the networked computer system 205, the port associator 230, a configurable module, works in tandem with the enabler module 245 to determine whether the RR communication 213 at issue is to have nodelay or delay enabled in its 213 transmission by the transmitter module 250. Turning now to more specifics about the port associator 230, this module is configured, as well as configurable, to associate some or all of the ports within the set 240 of ports with an associated parameter value of nodelay or delay on a per port basis. This means that whenever a packet in an RR communication 213 connects to a port configured with a parameter value of nodelay or delay as enabled by the port associator 230, then the enabler module 245 will read and enforce that value of nodelay or delay, which is then passed to the transmitter module 250 for ultimate transmission of the RR communication 213.

The logic associated with the port associator 230, the configurable workhorse of the invention, as well as the logic associated with the enabler module 245 and the transmitter module 250 may, for example, be located in coded logic, such as subroutines, in an operating system. For example, in an IBM operating system, the enabling logic is ideally inserted and placed in its /etc/ services file because the /etc/ services files already define the port numbers on which certain standard services are offered. The /etc/ services file enables server and client programs to convert service names to these port numbers. The list is kept on each host and it is stored in the file /etc/ service. By modifying the list by, for example, adding another column to the list with parameter values of nodelay or delay for each of the port numbers, enabled by the port associator 230, then each port has an associated delay or nodelay value for connections to that port. A system operator, for example, may choose to configure, or re-configure as one wishes, what ports have nodelay and what ports have delay. However, the /etc/ services file of an IBM operating system is not the only place the port associator 230 may associate ports with nodelay and delay values. Equally, whether an IBM operating system or not is utilized, the port associator 230 may instead, for example, associate the ports with nodelay or delay values on a network option table, a registry, or whatever that the networked computer system 205 may access before transmitting the RR communication 213 at issue through a port on the set 240 of ports. It is understood that the foregoing similarly applies for the placement of the enabling coded and/or hardware reduced logic for the enabler module 245 that reads and enforces the nodelay or delay value associated with a particular port and for the transmitter module 250 that sends the RR communication 213 based on the direction received by the enabling module 245 for transmitting the RR communication 213.

At this point, it is worthwhile to highlight what is achieved by this invention's enabling of nodelay for an RR communication 213 on a per port basis. The solution and result are simple, but powerful especially when viewed in the context of a networked computer system 205 that transmits thousands or millions of RR communications 213 on a daily basis. The powerful solution and result stems from being able to increase throughput on computers by enabling nodelay for the portion of the mix of communications not needing to wait for further filling of packets before transmitting the RR communication 213. The chief reason is that the portion of the mix of communications needing nodelay has small requests or responses which can be sent immediately upon receipt. However, enabling nodelay on a per adapter basis unnecessarily freezes transmission of these small requests or responses until the finite amount of time, such as 50-200 ms, passes before transmitting these small packets. Further, for the portion of RR communications 213 that do require delay, the invention still enables these RR communications to have the finite amount of time they need by a user, for example, configuring the port associator 230 with a delay value rather than a nodelay value for a particular port. As a result, the granularity of a networked computer system transmitting RR communications is improved because it can more flexibility and efficiently transmit the mix of RR communications burdening the system.

Figure 3:
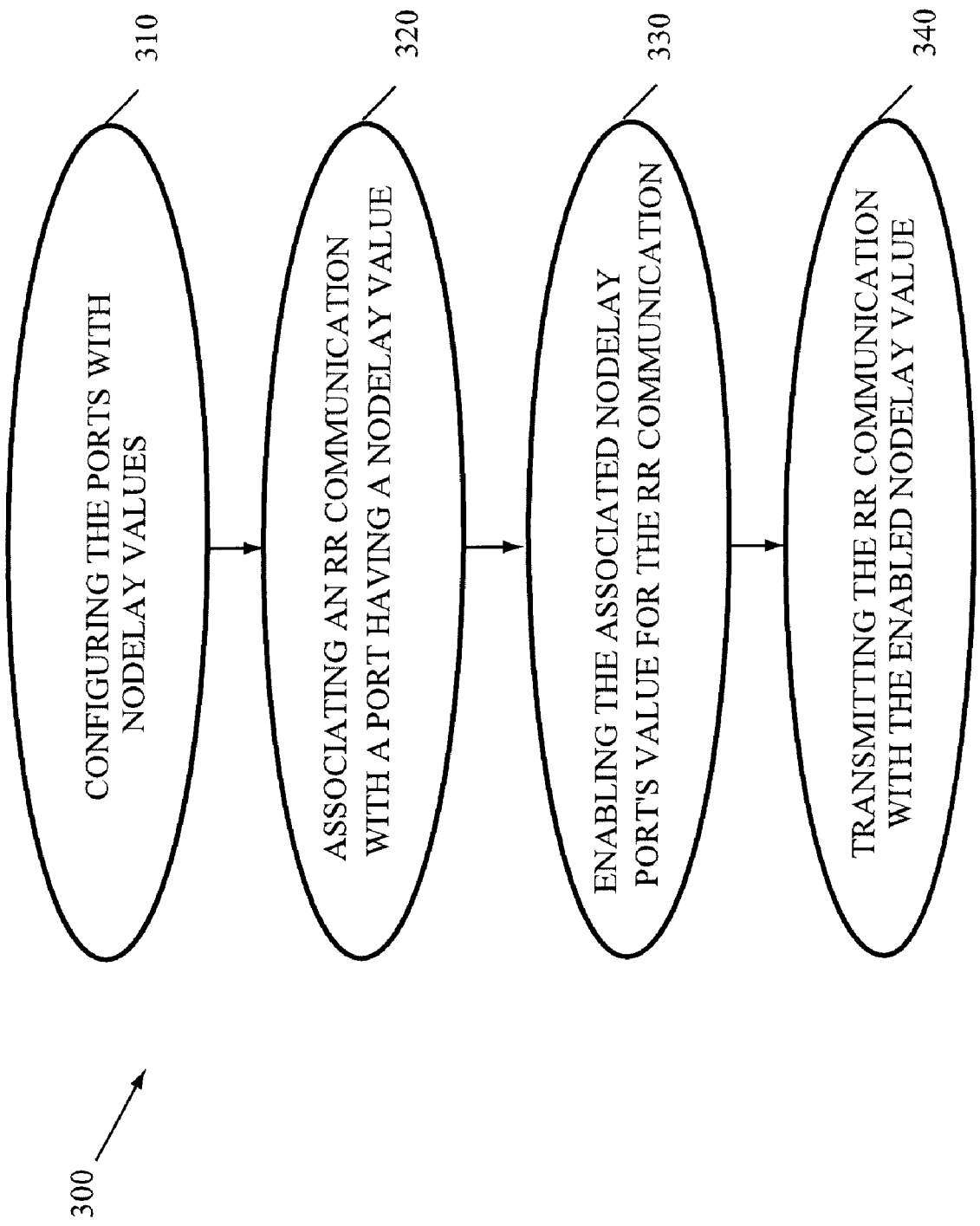
FIG. 3 depicts an example embodiment of a flowchart for improved granularity of a response-request communication for a networked computer system in accordance with the disclosed invention.

Turning now to FIG. 3, another aspect of the invention is disclosed. In particular, an embodiment of a flowchart 300 for improved granularity of a response-request communication on a networked computer system. Flowchart 300 is for a system, such as system 200, as shown in FIG. 2.

Flowchart 300 begins by configuring 310 at least one port in the set of ports associated with a networked computer system with a nodelay or delay value. As previously discussed, the configuring 310 is accomplished by inserting coded logic, for example, into the /etc/ service files of an IBM operating system that adds another column, for example, to the /etc/ service files that matches each port with a default nodelay or delay value. Although these default values are re-configurable, a default value is suggested at the start, and modification by re-configuration is possible if it is later realized that these values should be changed. The configuring 310 may also occur by associating nodelay or delay values with the ports through use of a registry or network option table accessible by an operating system used by the networked computer system.

Moving down the flowchart 300, associating 320 an incoming RR communication received by a networked computers system occurs. The associating 320 of the RR communication with a port is achieved through enabling logic by searching and finding, for example, the column in the /etc/ services file for the nodelay or delay value associated with the particular port at issue dedicated as a connectivity gateway for transmissions based on the headers of the packets comprising the substantive data of the RR communication. After the associating 320, the flowchart 300 continues by enabling 330 the nodelay value, such as true or false, by associated enabling coded logic for the particular port through which the RR communication traffic is to occur. Finally, the flowchart 300 terminates after the enabled 330 nodelay value for the port found to be associated with the RR communication is passed by further enabling logic for transmitting 340 the particular RR communication to its destination in a now known nodelay or delay manner.

Figure 4:
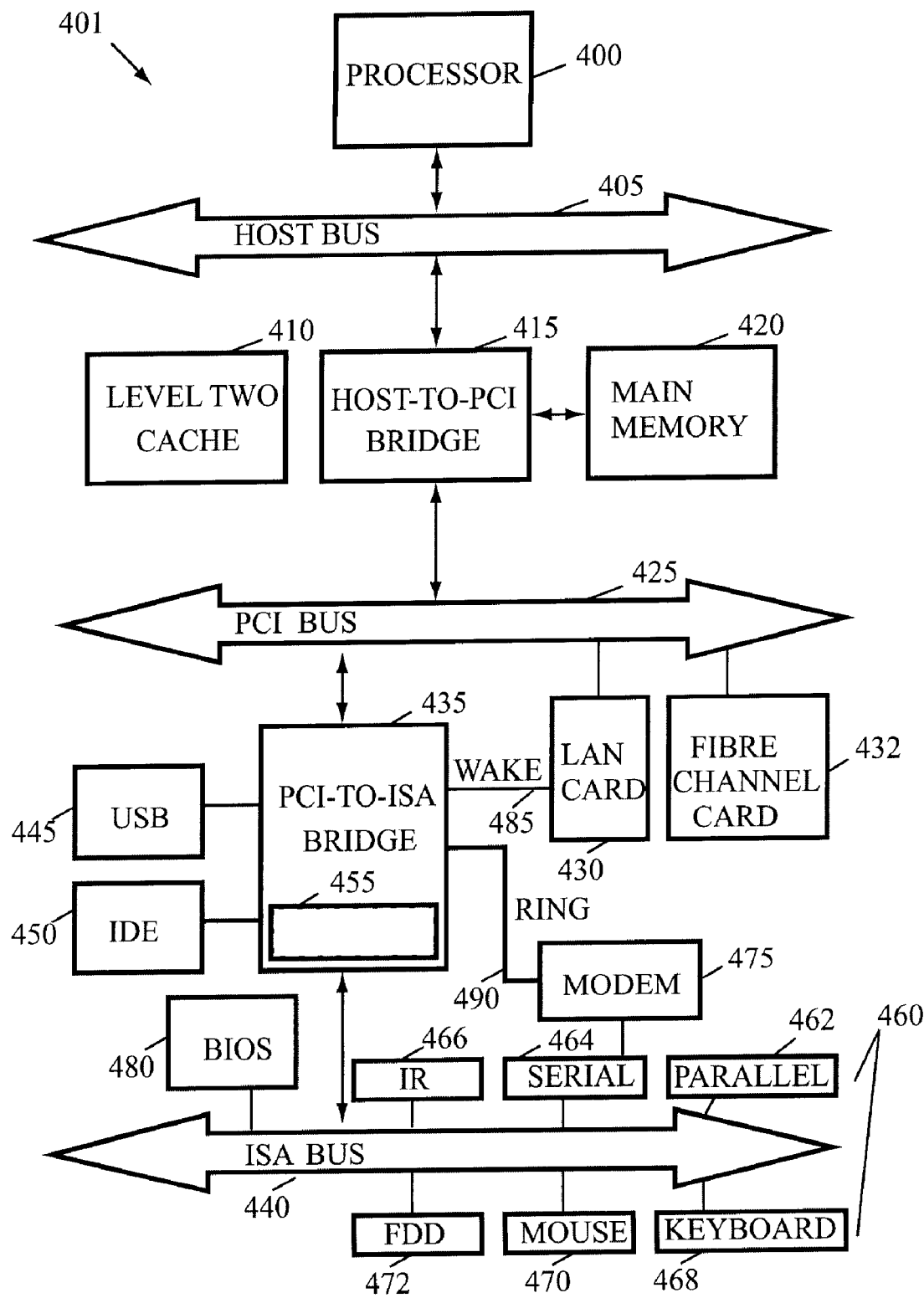
FIG. 4 depicts a computer system capable of being a networked computer system or computer system connected to the networked computer system as discussed in this disclosure, when provided with the appropriate messaging service software, for use in obtaining improved granularity of a response-request communication.

FIG. 4 illustrates information handling system 401 which is a simplified example of a computer system capable of performing the operations described herein. Computer system 401 includes processor 400 which is coupled to host bus 405. A level two (L2) cache memory 410 is also coupled to the host bus 405. Host-to-PCI bridge 415 is coupled to main memory 420, includes cache memory and main memory control functions, and provides bus control to handle transfers among PCI bus 425, processor 400, L2 cache 410, main memory 420, and host bus 405. PCI bus 425 provides an interface for a variety of devices including, for example, LAN card 430. PCI-to-ISA bridge 435 provides bus control to handle transfers between PCI bus 425 and ISA bus 440, universal serial bus (USB) functionality 445, IDE device functionality 450, power management functionality 455, and can include other functional elements not shown, such as a real-time clock (RTC), DMA control, interrupt support, and system management bus support. Peripheral devices and input/output (I/O) devices can be attached to various interfaces 460 (e.g., parallel interface 462, serial interface 464, infrared (IR) interface 466, keyboard interface 468, mouse interface 470, fixed disk (HDD) 472, removable storage device 474) coupled to ISA bus 440. Alternatively, many I/O devices can be accommodated by a super I/O controller (not shown) attached to ISA bus 440.

BIOS 480 is coupled to ISA bus 440, and incorporates the necessary processor executable code for a variety of low-level system functions and system boot functions. BIOS 480 can be stored in any computer readable medium, including magnetic storage media, optical storage media, flash memory, random access memory, read only memory, and communications media conveying signals encoding the instructions (e.g., signals from a network). In order to attach computer system 401 to another computer system to copy files over a network, LAN card 430 is coupled to PCI bus 425 and to PCI-to-ISA bridge 435. Similarly, to connect computer system 401 to an ISP to connect to the Internet using a telephone line connection, modem 475 is connected to serial port 464 and PCI-to-ISA Bridge 435.

While the computer system described in FIG. 4 is capable of executing the invention described herein, this computer system is simply one example of a computer system. Those skilled in the art will appreciate that many other computer system designs are capable of performing the invention described herein.

Another embodiment of the invention is implemented as a program product for use with a computer system such as, for example, the system 100 and system 200 shown in FIG. 1 and FIG. 2. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

While the foregoing is directed to example embodiments of the disclosed invention, other and further embodiments of the invention may be devised without departing from the basic scope thereof, and the scope thereof is determined by the claims that follow.

What is claimed is:

1. A computer-readable storage medium containing instructions, which when executed by a machine, cause the machine to perform operations for improved granularity of a response-request communication on a networked computer system, comprising:
   receiving the request-response communication by the networked computer system;
   associating the request-response communication with a port, having a nodelay setting, from a set of ports on the networked computer system;
   enabling, based upon the associating, the nodelay setting upon connection of the request-response communication with the port; and
   sending, in accordance with the enabling, the request-response communication to a destination in communication with the networked computer system.

2. The computer-readable storage medium of claim 1, further comprising instructions for performing operations for configuring, prior to invoking the instructions for performing operations for the machine-accessible medium, at least the port from the set of all ports on the networked computer system with a nodelay value indicating whether to enable nodelay.

3. The computer-readable storage medium of claim 2, wherein the instructions for configuring comprises instructions for configuring a network option table associated with the networked computer system.

4. The computer-readable storage medium of claim 2, wherein the instructions for configuring comprises instructions for configuring a registry associated with the networked computer system.

5. The computer-readable storage medium of claim 2, wherein the instructions for configuring comprises instructions for configuring a portion of an operating system associated the networked computer system.

6. The computer-readable storage medium of claim 1, wherein the instructions for associating comprises instructions for finding the port in the set of ports that is appropriate for the request-response communication.

7. The computer-readable storage medium of claim 1, wherein the instructions for enabling the nodelay setting comprises instructions for enabling nodelay selected from the group consisting of no nodelay and nodelay.

* * * * *